(No Model.)

C. J. PETERSON.
GUANO DISTRIBUTER.

No. 468,826. Patented Feb. 16, 1892.

Witnesses:

Inventor
Charles J. Peterson,
By his Attorneys,
C. A. Snow & Co.

UNITED STATES PATENT OFFICE.

CHARLES J. PETERSON, OF TIRZAH, SOUTH CAROLINA, ASSIGNOR OF ONE-HALF TO RICHARD T. GILLESPIE, OF SAME PLACE.

GUANO-DISTRIBUTER.

SPECIFICATION forming part of Letters Patent No. 468,826, dated February 16, 1892.

Application filed July 18, 1891. Serial No. 399,945. (No model.)

*To all whom it may concern:*

Be it known that I, CHARLES J. PETERSON, a citizen of the United States, residing at Tirzah, in the county of York and State of South Carolina, have invented a new and useful Guano-Distributer, of which the following is a specification.

This invention relates to improvements in cotton-planters, and has for its object the provision of a fertilizer-distributer to work in conjunction with the cotton-planter, and hence simultaneously perform the operation of planting the seed and distributing in the furrow the fertilizing agent.

With the above main objects in view the invention consists in certain features of construction and combinations of parts hereinafter appearing, and particularly pointed out in the claims.

Figure 1:
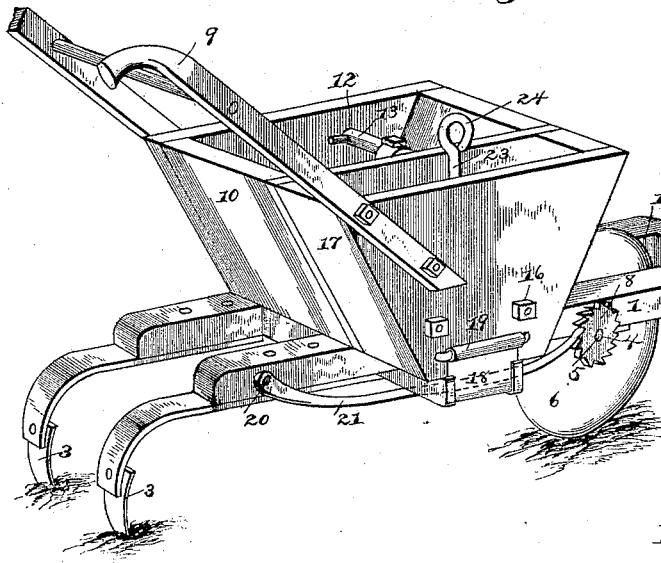
Figure 4:
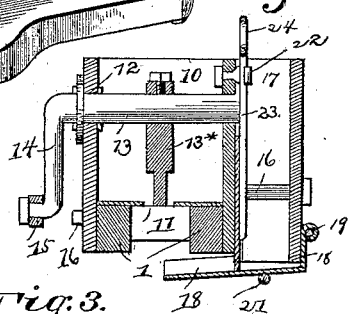
Figure 2:
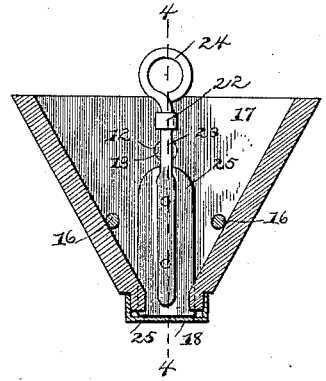
Figure 3:
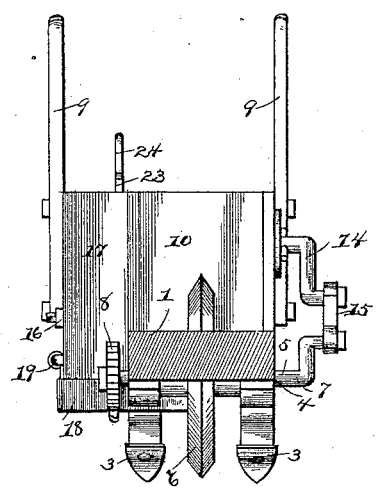

Referring to the drawings, Figure 1 is a perspective of a cotton-seed planter provided with a fertilizer-distributing mechanism constructed in accordance with my invention. Fig. 2 is a longitudinal section through the fertilizer-hopper. Fig. 3 is a transverse section thereof. Fig. 4 is a transverse section on the line 4 4, Fig. 2.

Like numerals of reference indicate like parts in all the figures of the drawings.

1 designates the opposite side beams comprised in the frame-work of the planter, and the same are, as is usual, connected at their front ends by the draft-tongue 2. The rear ends of the beams terminate in covering-shovels 3, and near their front ends, upon their under sides, said beams are provided with opposite bearings 4, in which is journaled the axle 5. The axle 5 has mounted thereon, between the beams, the furrow-opening wheel 6, and at one side, outside of the beams, terminates in a crank 7, while the opposite end carries a ratchet-wheel 8, the purpose of which latter will hereinafter appear.

9 designates the rearwardly-disposed handles, the lower ends of which are clamped to the outer sides of the hopper. Between the handles, upon the beams, is seated the cotton-seed hopper 10, provided at its bottom with the seed-opening 11 and has journaled in its opposite side walls, in bearings 12, the transverse agitator-shaft 13, one end of which projects beyond the hopper and is bent to form the crank-arm 14, which is greater in length than the crank 7 of the axle. These two cranks are connected by the usual pitman 15, so that a rotary movement of the crank 7 will impart a rocking movement to the agitator-shaft, which latter, it will be understood, carries the usual agitating fingers or arms 13*.

To one side of the hopper 10 there is secured by means of bolts 16 a second smaller hopper 17, the lower end of which terminates in the discharge-opening.

18 designates a delivery-shoe, which is somewhat of L shape in section and is pivoted or hinged, as at 19, to the exterior of the hopper 17, and by reason of its L shape projects under the discharge-opening of the same. To one of the beams 1 there is pivoted, as at 20, a forwardly-disposed curved pawl or rod 21, said rod passing under the hinged shoe just described and terminating at its free end upon the periphery of the ratchet-wheel 8 and adapted to ride over the teeth of the latter as the wheel revolves.

In a guide-bracket 22, located upon the inner wall of the fertilizer-containing hopper, there is mounted for vertical adjustment a rod 23, terminating at its upper end above the hopper in a handle 24 and within the hopper connected with a gate or cut-off 25, adapted to be forced down into the shoe, so as to close the mouth of the latter, or be elevated out of contact with said shoe, so as to open the mouth thereof. The opposite sides of the shoe are upwardly bent to embrace the lower end of the hopper, so that when the gate is closed exit of fertilizer is prevented.

In operation the cotton-seed are placed in the hopper 10 and the fertilizer placed in the hopper 17. The machine being started, the seed is dropped in the usual manner in the furrow formed by the wheel 6 and covered by the following plows. As the wheel rotates the movement of the pawl riding over the teeth of the ratchet serves to agitate the shoe, and thus small portions of fertilizer are dropped with the seed into the furrow and covered by the plows. It will be seen that the quantity of fertilizer may be regulated by the degree of elevation given the cut-off or gate.

From the foregoing description, taken in connection with the accompanying drawings, it will be obvious that I succeed in providing a very simple means for simultaneously dropping the fertilizer agent with the seed, and that the attachment whereby the same is accomplished may be most readily applied to planters of the ordinary construction without materially changing their constructions or altering their operations.

Having described my invention, what I claim is—

1. The combination, with the planter-frame, the hopper, the furrow-opening wheel, and the axle for the same, of the ratchet-wheel mounted on the axle, the fertilizer-hopper secured at one side of the seed-hopper, the hinged shoe secured to the fertilizer-hopper and terminating under the seed-hopper, and the pawl pivoted in rear of the hoppers, extending under the hinged shoe, and terminating upon the periphery of the ratchet-wheel, substantially as specified.

2. The combination, with the opposite beams, the superimposed seed-hopper, the axle, the furrow-opening wheel, and the ratchet-wheel mounted thereon, of the supplemental hopper bolted to one side of the main hopper, an L-shaped shoe hinged to the outside of the supplemental hopper and having its opposite edges embracing the side walls thereof and at its free end terminating under the discharge of the main hopper, the pawl pivoted in rear of the hopper, curved under the free end of the shoe, resting on the ratchet, the bracket located at the inside of the supplemental hopper, and the rod mounted for vertical movement therein, terminating above the hopper in a handle and within the same in a cut-off, substantially as specified.

In testimony that I claim the foregoing as my own I have hereto affixed my signature in presence of two witnesses.

CHARLES J. PETERSON.

Witnesses:
R. A. RUDISILL,
I. F. ADKINS.